United States Patent [19]
Shin et al.

[11] Patent Number: 5,724,451
[45] Date of Patent: Mar. 3, 1998

[54] IMAGE COMPRESSION METHOD AND APPARATUS USING CONDITIONAL QUADTREE SPLIT SYSYEM

[75] Inventors: Jae-seob Shin; Shi-hwa Lee; Yang-seock Seo, all of Seoul, Rep. of Korea

[73] Assignee: Samsung Electronics Co., Ltd., Kyungki-do, Rep. of Korea

[21] Appl. No.: 364,442

[22] Filed: Dec. 27, 1994

[30] Foreign Application Priority Data

Sep. 27, 1994 [KR] Rep. of Korea .............. 94-24351

[51] Int. Cl.$^6$ .................................................. C06K 9/36
[52] U.S. Cl. ............................................................ 382/240
[58] Field of Search ............................ 382/226, 239, 382/236, 240; 358/433; 348/399, 408, 420

[56] References Cited

U.S. PATENT DOCUMENTS

| | | | |
|---|---|---|---|
| 5,225,904 | 7/1993 | Golin et al. ................ | 348/410 |
| 5,228,098 | 7/1993 | Crinon et al. ............... | 382/240 |

FOREIGN PATENT DOCUMENTS

| | | | |
|---|---|---|---|
| 89 03159 | 4/1989 | WIPO ............... | H04N 9/80 |

OTHER PUBLICATIONS

Strobach et al., Space–Variant Regular Decomposition Quadtrees in Adaptive Interframe Coding, 1988, pp. 1096–1099.

Huang et al., A new motion compensation method for image sequence coding using hierachical grid interpolation, Feb. 1994, pp. 42–51.

IEEE Computer Graphics And Applications, vol. 8, No. 3, May 1988 Samet et al., "Hierarchical Data Structures and Algorithms for Computer Graphics", pp. 48–66.

Pattern Recognition, vol. 20, No. 33, pp. 309–319, 1987, Fiala et al. "Comparison of a regular and an irregular decomposition of regions and volumes".

Kim et al., "On The Hierarchical Variable Block Size Motion Estimation Technique For Motion Sequence Coding", SPIE, vol. 2094, pp. 372–383.

Primary Examiner—Joseph Mancuso
Assistant Examiner—Timothy M. Johnson
Attorney, Agent, or Firm—Leydig, Voit & Mayer, Ltd.

[57] ABSTRACT

An image compression method employing a conditional quadtree split method includes inputting image data in frame or field units as blocks having a predetermined size; generating an average value for all of the pixels in each block and a sub-block code value for determining whether to perform sequential quad-splitting operations on the block into a suitable sub-block according to image type; and outputting a quadtree map drawn according to the sub-block code value and the average value of each block, as a bit stream. An apparatus employing the method can transmit good quality image data having no distortion at a high transmission rate.

10 Claims, 7 Drawing Sheets

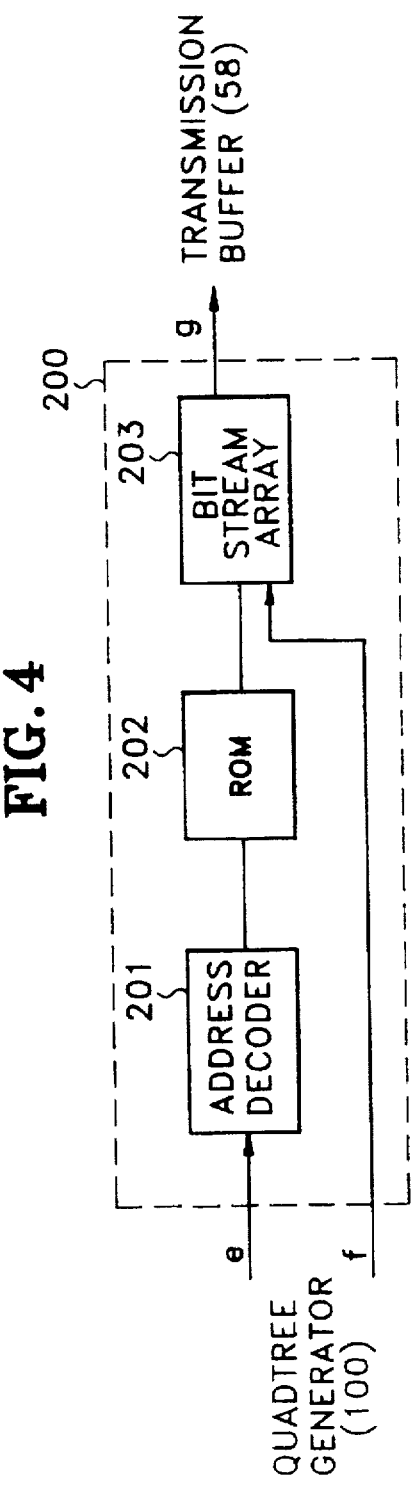
FIG. 4
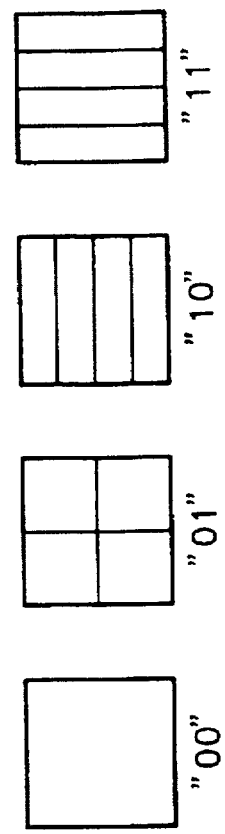
FIG. 5B
| QUADTREE TYPE | ALLOCATED BIT |
|---|---|
| NO NEED FOR SPLIT | 00 |
| SPLIT TO NORMAL QUAD | 01 |
| SPLIT TO HORIZONTAL QUAD | 10 |
| SPLIT TO VERTICAL QUAD | 11 |
FIG. 5A

FIG. 7
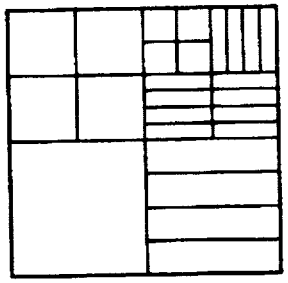
"0100010000000110000000001110
000000010000000100000001000000000"
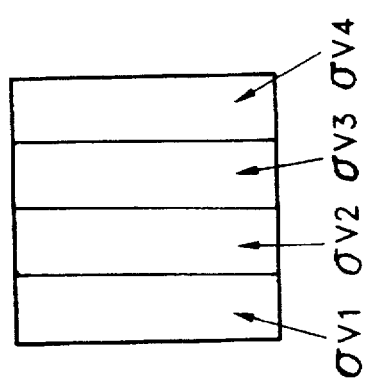
$\sigma_{V1}$ $\sigma_{V2}$ $\sigma_{V3}$ $\sigma_{V4}$
FIG. 6
$\sigma_i$
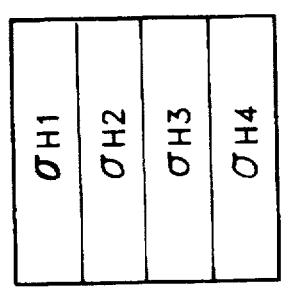
$\sigma_{H1}$ $\sigma_{H2}$ $\sigma_{H3}$ $\sigma_{H4}$
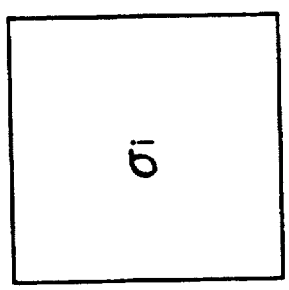
$\sigma_{N1}$ $\sigma_{N2}$ $\sigma_{N3}$ $\sigma_{N4}$

IMAGE COMPRESSION METHOD AND APPARATUS USING CONDITIONAL QUADTREE SPLIT SYSYEM

BACKGROUND OF THE INVENTION

The present invention relates to an image compression method and apparatus, and more particularly, to an image compression method and apparatus using a conditional quadtree split system that compensates for problems of a method using a conventional quadtree so that an image restored after being compressed can appear more natural.

An image processing device such as a digital videophone, image database service, home shopping service and car image data service employs a system in which image data is compressed before being transmitted in order to enhance the transmission. However, if data is compressed, screen quality is degraded as compared with the original image. Accordingly, development of image compression techniques in which transmission efficiency is maximized by raising the data compression ratio so that an image approaching the quality of the original can be obtained upon image restoring has been underway.

Several conventional methods have proposed improved techniques in that a quadtree itself is not changed and data reduction is devised only by varying the expression method (reference: (1) Peter Strobach, "Tree-structured Scene Adaptive Coder," *IEEE Transactions on Communication* Vol. 38, No. 4, April 1990; (2) Jong Won Kim and Sang Uk Lee, "Hierarchical Variable Block Size Motion Estimation Technique for Motion Sequence Coding," *SPIE* Vol. 2094, 1994; and (3) U.S. Pat. No. 5,228,098, Tektronix Inc., "Adaptive Spatiotemporal Compression/Decompression of Video Image Signals," July 1993).

Various methods are used for digital image compression. However, recently, there have been many studies on a method for reducing data quantity by understanding the image structure. As conventional methods, a contour texture coding method analyzes boundary components of an image and internal components surrounded by the boundary components and employs the result for image compression. Additional methods include a segmentation method for expressing portions grouped according to homogeneity, a model-based coding method for preparing a pre-arranged model and describing the input image based on the model, and a wavelet and fractal method using a transform.

A tree-structured scene adaptive coder of a conventional method, which is related to the segmentation method described above, is a technique for transmitting an error signal according to motion estimation and motion compensation of a moving image sequence by employing a conventional quadtree. In the hierarchical variable block size motion estimation technique for motion sequence coding, a conventional quadtree is used, similar to the above-described method. However, a method for describing the quadtree is made more efficient, to maintain less compressed data. In U.S. Pat. No. 5,228,098, a three-dimensional quadtree is applied to a moving image sequence. Thus, the method for describing a quadtree differentiates with respect to a moving portion and stationary portion, in order to reduce the quantity of bits. However, the above-described method still employs the conventional quadtree. In more detail, the basic structure of the quadtree method can be expressed as follows. Same-sized arbitrary square blocks are split into four sub-areas having a predetermined size based on some judgement criteria (for example, the degree of change or relativity of average value of pixels in the blocks).

A step of further dividing the four sub-areas by adopting the above-described method is repeated until a predetermined window size is reached. Then, a split quadtree map that can describe each split area and a value representing each split area is transmitted. Then, a receiver receives the result and produces a reproduced image. Each layer of the quadtree only displays whether or not the block or area is split. Therefore, the quadtree split map according to each layer can be expressed merely by 1-bit data. This method has been studied, and the four above-mentioned techniques propose methods for reducing data further by more efficiently drawing up the split quadtree map representing the basic concept of the above-described method.

However, the above-described conventional methods employ a quadtree structure where the trees are split into regular squares from each layer, to maintain a step error at one half value. Thus, structural characteristics of an image, specifically the image quality of an edge portion, is degraded, thereby generating image distortion. An increase in the number of layers to reduce such error and thus compensate image quality causes an increase in the quantity of data to be processed and thwarts data reduction.

SUMMARY OF THE INVENTION

Accordingly, it is an object of the present invention to provide an image compression method and apparatus using a conditional quadtree system for reducing data in spite of further reduction of a step error according to image characteristics.

To accomplish the above object of the present invention, there is provided an image compression method comprising the:

inputting image data of frame unit or field unit by main block units having a predetermined size;

generating a representative value of each block and selective split data that depends on whether or not to perform sequential quad-splitting operations on the main block into one type selected among a plurality of sub-blocks according to an image type of the main block, as quadtree data; and outputting a quadtree map drawn according to the selective split data of the quadtree data and the representative value of each block, as a bit stream.

A plurality of sub-block types consist of a regular quartering, rectangular quartering and horizontal quartering. The image type of each block is a distribution value with respect to a plurality of pixel values within a block, and the representative value is an average value of pixels in each block.

Generating quadtree data comprises:

(a) obtaining distribution value and average value with respect to pixel value in each split sub-block with respect to a block and a plurality of sub-block types;

(b) determining whether to split a quadtree by comparing the distribution value with a predetermined threshold value;

(c) generating first selective split data and the obtained average block value as quadtree data, if the quadtree is not to be split;

(d) comparing distribution value for each split sub-block of a plurality of sub-block types so as to detect a minimum value, if the quadtree is to be split;

(e) selecting an average value corresponding to the minimum distribution value detected among the average values with respect to the plurality of split sub-blocks;

(f) generating a sub-block type code value corresponding to the detected minimum value;

(g) generating the selected average value and the generated code value as quadtree data;

(h) determining the size of an input block according to the detection result; and (i) repeating steps (d) to (h) until the size of the split sub-block reaches a predetermined size.

Thus, an image distortion does not occur and data can be reduced since a sub-block type suitable for the image type is selected from among a plurality of sub-block types.

An image compression apparatus of the present invention comprises:

a block memory for receiving and storing image data of frame unit or field unit by main block units having a predetermined size;

a quadtree generator for generating a representative value of each block and selective split data that depends on whether or not to perform sequential quad-splitting operations on the main block into one type selected among a plurality of sub-blocks according to an image type, as quadtree data;

quadtree map drawing means for outputting a quadtree map drawn according to the selective split data of the quadtree data and the representative value of each block, as a bit stream.

The quadtree generator comprises first computing means for respectively obtaining a first distribution value and a first average value from a pixel value in a main block of the block memory; a plurality of second computing means for obtaining a second distribution value and a second average value from a pixel value in each split sub-block with respect to a plurality of sub-block types of the block memory; a comparator for comparing the first distribution value with a predetermined threshold value so as to determine whether to split a quadtree; a minimum value detector for detecting the minimum value by comparing the second distribution values of the second computing means; a data selector for selecting an average value corresponding to the minimum distribution value detected from the minimum value detector among the second average values of the second computing means; a quadtree code value generator for generating a sub-block type-code value corresponding to the detected minimum value; an output selector for selecting, according to the determination result of the comparator, the first average value of the first computing means, the code value of the code value generator and the second average value selected by the data selector, and outputting the result as selective split data and representative value; and block size determining means for determining the size of a next input block with reference to block size data which is input currently according to the detection result of the minimum value detector.

The quadtree map drawing means comprises an address decoder for decoding the selective split data so as to generate an address signal; a ROM table for generating a quadtree map designated by the decoded address signal; and a bit stream array for outputting the generated quadtree map and the representative value as a bit stream.

An embodiment for compressing a moving image data of the present invention comprises a frame memory for receiving frame unit image data; a data selector for selecting image data and image variation data provided from the frame memory; a block memory for receiving and storing the frame unit image data selected from the data selector by main block units having a predetermined size; a quadtree generator for generating a representative value of each block and selective split data that depends on whether or not to perform sequential quad-splitting operations on the main block into one type selected among a plurality of sub-blocks according to an image type, as quadtree data; quadtree map drawing means for outputting a quadtree map drawn according to the selective split data of the quadtree data and the representative value of each block, as a bit stream; an image synthesizer for receiving the bit stream which is output from the quadtree map drawing means so as to synthesize image data; a reproduction memory for storing image data of the previous frame played back by the image synthesizer; subtracting means for obtaining image variation data between image data of the current frame provided by the frame memory and image data of the previous frame provided by the reproduction memory; and a transmission buffer for transmitting the bit stream output from the quadtree map drawing means.

BRIEF DESCRIPTION OF THE INVENTION

The above objects and other advantages of the present invention will become more apparent by describing in detail a preferred embodiment thereof with reference to the attached drawings in which:

FIG. 4 is a block diagram showing a detailed structure of the quadtree map drawing portion of FIG. 2;

FIG. 5a and FIG. 5b illustrate a bit type allocated to a conditional quadtree of the present invention;

FIG. 6 illustrates a quadtree split condition;

FIG. 7 illustrates an embodiment of the quadtree split of the present invention and a bit stream;

DETAILED DESCRIPTION OF THE INVENTION

The present invention will be explained in more detail with reference to the attached drawings.

The present invention can be applied to both a still image consisting of a single stage and a moving image consisting of several stages. Data is divided according to a distribution characteristic of the image within a block based on regularity and boundaries in the image. Then, the divided data and a representative value which is most suitable for the divided data are transmitted, to describe an image nearly perfectly while using only a small quantity of data.

Figure 1:
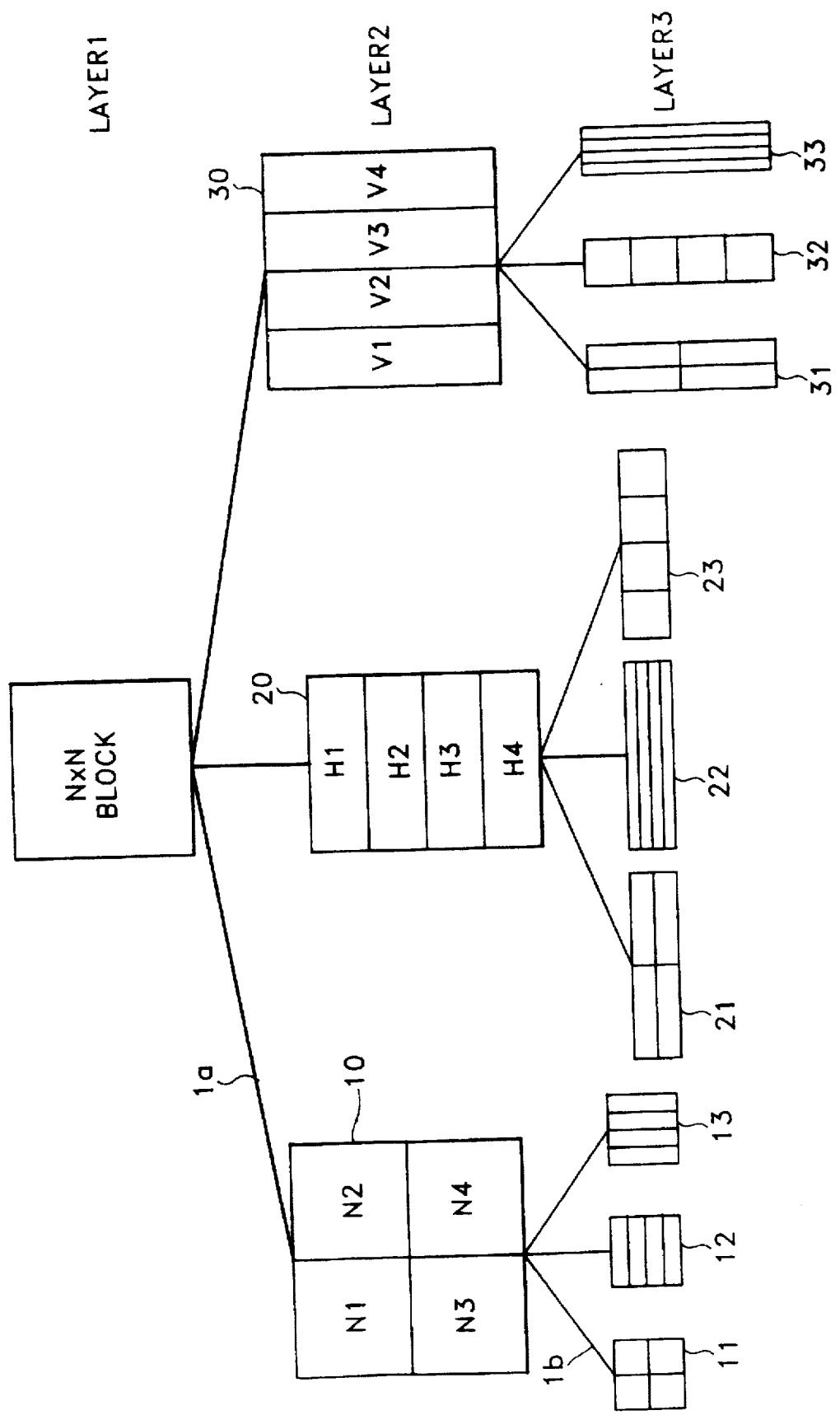
FIG. 1 illustrates a structure of a conditional quadtree employed for an image compression method of the present invention.

FIG. 1 illustrates a block split type of a three-level conditional quadtree split system of the present invention. An N×N size block 1 is shown in layer 1, and three sub-blocks 10, 20 and 30 are shown in layer 2, and the sub-blocks having each sub-block as a main block are shown in layer 3. That is, a quad split of a tree structure of 1-1a-1b of FIG. 1 is performed as a conventional method. However, in the present invention, one of the following three cases is selected for the N×N size block 1 of layer 1 by determining a distribution condition of an image with respect to an arbitrary block. First, the N×N size block is split into four quadrant N/2×N/2 blocks 10 (N1, N2, N3 and N4) of layer 2. Second, the N×N size block is split into N×N/4 horizontal rectangular blocks 20 (H1, H2, H3 and H4). Third, the N×N size block is split into N/4×N vertical rectangular blocks 30 (V1, V2, V3 and V4). Then, it is determined whether or not to further divide blocks N1, N2, N3 and N4 into three sub-blocks 11, 12 and 13 of N/4×N/4, N/2×N/8, N/8×N/2, it is determined whether or not to further divide blocks H1, H2, H3 and H4 into three sub-blocks 21, 22 and 23 of N2×N/8, N×N/16 and N/4×N/4, and it is determined whether or not to divide blocks V1, V2, V3 and V4 into three sub-blocks 31, 32 and 33 of N/8×N/2, N/4×N/4 and N/16×N. As a result, a reproduced image which is more similar to an original image can be obtained since blocks split according to image type have a similar form. In addition, the number of blocks after splitting is reduced, to thereby reduce the bit rate requirement. The above-described method can be effectively used in image compression for transmitting image data via a transmission channel having an extremely low transmission rate.

Figure 2:
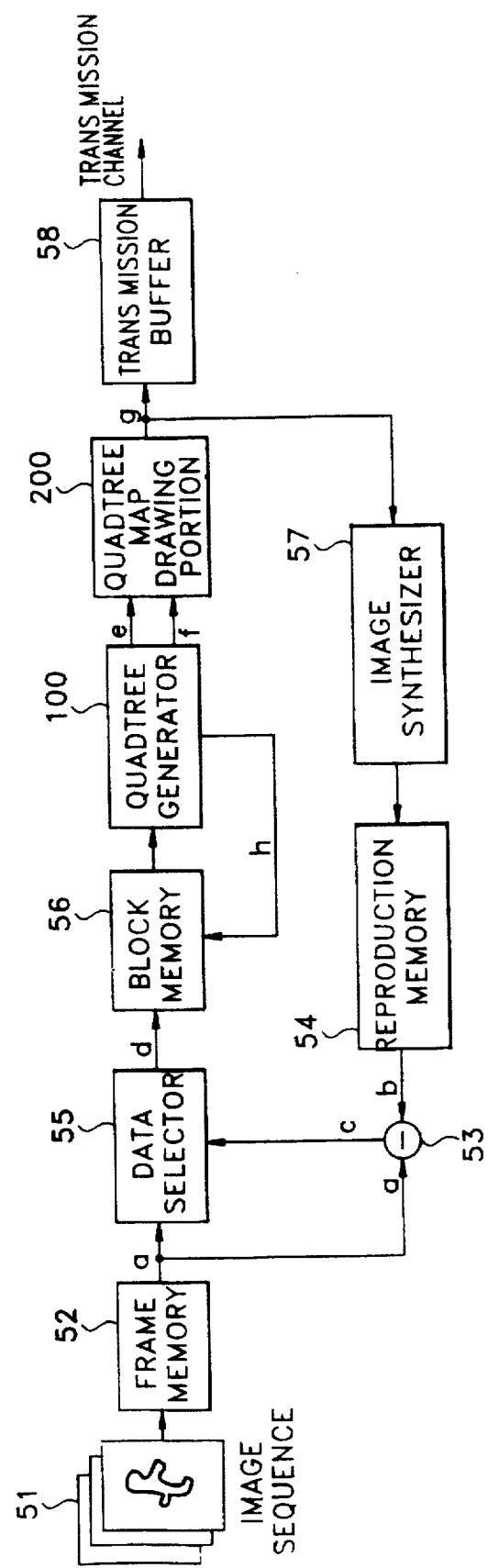
FIG. 2 is a block diagram showing an embodiment of an image compression apparatus of the present invention.

Referring to FIG. 2, each frame of data is stored in a frame memory 52 in frames corresponding to an input image sequence 51. At the same time, a subtracter 53 subtracts data b from a reproduction memory 54 where the immediately preceding frame to be played back is stored from data a of frame memory 52. Then, the result data c, i.e., the image variation between data a and data b, is input to a data selector 55. That is, for the case of using original image data of the current frame without change, data a which is received directly from frame memory 52 is used. When a variance signal is used, data c can be employed. The thus-selected data d goes through a block memory 56 and is provided to a quadtree generator 100 that efficiently divides areas of the data according to criteria and obtains quadtree data e and representative value f of an area consisting of quadtrees. A quadtree map drawing portion 200 prepares a ROM table by using data e and value f. Then, the quadtree data and representative values are made into a bit stream data g, stored in transmission buffer 58, synchronized by a clock and transmitted via a transmission channel. Meanwhile, bit stream data g produced by quadtree map drawing portion 200 is also transmitted to an image synthesizer 57. Then, an image is played back by employing bit stream data g and stored in reproduction memory 54. The stored image is used for obtaining a variance signal of a reproduced image between the current frame and the previous frame when data of the next frame is processed.

The present invention is a method that adopts a sequential segmentation to reduce image redundancy, among image compression methods. However, when image compression is performed by employing a variance signal between frames in a moving image sequence, a quadtree can be controlled variably depending on an image structure, in order to effectively transmit the error signal. Thus, the blocking of conventional methods or unnatural image splitting can be reduced, thereby improving the quality of the compressed and restored image, the most important aspect of the present invention.

In other words, in the present invention, an image is read-out as a block of a predetermined sized as shown in FIG. 1 with respect to the respective input image sequence data. Then, the read image is compared with a specific condition. If the condition is satisfied, the block is split into four specific blocks. When the block reaches the minimum unit block, the process stops.

A conventional quadtree is structured so that the block is split regularly, i.e., into squares (the leftmost of FIG. 1).

When only such a structure is employed, it is very hard to effectively express area according to image type. As a result, data compression efficiency is degraded. Accordingly, the present invention has a structure in which the block is split into three different types starting from an upper-level square. The three types of splitting are quadrant (11), horizontal rectangles (12), and vertical rectangles (13), as shown in FIG. 1. As for each block, it is determined whether to divide the block into the three sub-blocks. These steps are repeated until the block reaches the minimum unit block.

The step of generating quadtree data obtains a distribution value and an average value using each of the pixel values in the block and in each split sub-block with respect to a plurality of sub-block types. Whether to split a block into a sub-block is determined by the distribution of pixel in the block. If it is assumed that a block is N×N, pixel value in a block is P(i,j) and an average pixel value in a block is Pa(i,j), the distribution value σ can be expressed as follows.

$$\sigma \left( \frac{1}{N \times N} \right) \sum_{i=0}^{N-1} \sum_{j=0}^{N-1} (Pa(i,j) - P(i,j))^2$$

It is determined whether a block is to be split into a sub-block depending on the relationship between the distribution value with respect to the block, obtained as described above, and a predetermined threshold value.

If there is no need to split the block, a first selective data and the obtained average value of the block are generated as quadtree data. If the block needs to be split, distribution values for each split sub-block are compared so as to detect the minimum value and select the average value corresponding to the minimum distribution value detected among the average values of a plurality of split sub-blocks. Then, the sub-block type-code value corresponding to the detected minimum value is generated, and the selected average value and the generated code value are generated as quadtree data. Then, size of an input block is determined from the result of the detection. The above steps, starting from detecting the minimum value to determining the block size, are repeated until the size of the sub-block reaches a predetermined size.

Figure 3:
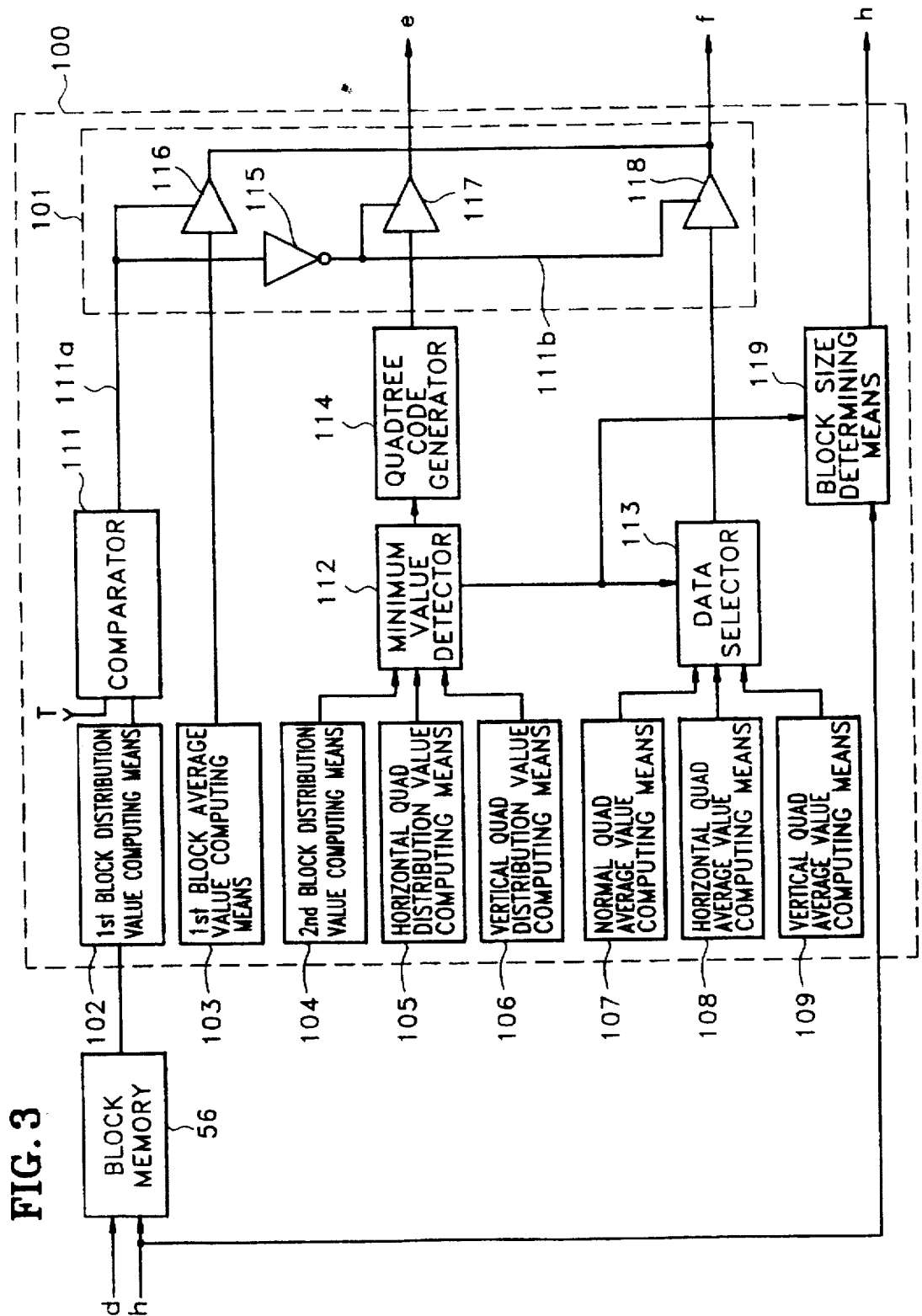
FIG. 3 is a block diagram showing a detailed structure of the conditional quadtree generator of FIG. 2.

As shown in FIG. 3, a block of predetermined size among the one frame image output from data selector 55 is received via block memory 56. Then, a first average value for the block is calculated by a first block distribution value computing means 102, and simultaneously, a first average value is calculated by a first block average value computing means 103. At the same time, second average values and second distribution values for the three type blocks to be split into the lower trees are calculated by second block distribution value computing means 104 to 106 and second block average value computing means 107 to 109, respectively. That is, as shown in FIG. 1, the block is horizontally and vertically split into two segments, and an average value and a distribution value with respect to four quadrant N/2×N/2 blocks 10 (N1, N2, N3 and N4) are obtained via distribution value computing means 104 and normal quad average value calculator 107. Using the same method, distribution value and average value with respect to N×N/4 blocks 20 (H1, H2, H3 and H4) are obtained via horizontal quad distribution value computing means 105 and horizontal quad average value computing means 108. Then, average value and distribution value with respect to N/4×N block 30 are obtained via vertical quad distribution value computing means 106 and vertical quad average value T computing means 109. At this time, a first distribution value ($\sigma_i$ of FIG. 6) of the block is compared with a predetermined threshold value T via comparator 111. If the first distribution value is smaller than the threshold value, there is no need to split the block into sub-blocks. Thus, the output of comparator 111 is high, and a first output buffer 116 of output selector 101 is enabled, and second and third output buffers 117 and 118 are disabled via a signal that passes through an inverter 115. If the distribution value is larger than the threshold value, the block has to be split into sub-blocks. Thus, the output of comparator 111 is low, and first output buffer 116 is disabled, and second and third output buffers 117 and 118 are enabled via the inverted signal 111a output from inverter 115. Here, a quadtree structure having the minimum distribution value detected from minimum value detector 112 is selected by the distribution value with respect to the above-mentioned three quadtrees. At this time, an average value is selected from data selector 113 by the selected value. Then, quadtree data e and average value thereof are output via the enabled second and third output buffers 117 and 118. At this time, the criteria for selecting the minimum distribution among the three quadtree structures are as follows. As shown in FIG. 6, the sum of distribution values $\sigma_{N1}$, $\sigma_{N2}$, $\sigma_{N3}$ and $\sigma_{N4}$ with respect to quadrant quad, sum of distribution values $\sigma_{H1}$, $\sigma_{H2}$, $\sigma_{H3}$ and $\sigma_{H4}$ with respect to horizontal quad, and sum of distribution values $\sigma_{V1}$, $\sigma_{V2}$, $\sigma_{V3}$ and $\sigma_{V4}$ with respect to vertical quad, are compared, and the minimum value of the three is selected as a minimum distribution value. In addition, an average value thereof is selected from among second average values by data selector 113. A code corresponding to the thus-obtained quadtree is generated via quadtree code generator 114. However, as shown in FIG. 5A and FIG. 5B, data needs to be allocated so that the receiving terminal can recognize the quadtree structure. If there is no need to split the N×N block to sub-blocks, the data is allocated as "00". If the block is split into a quadrant quad, the data is allocated as "01", and if the block is split into a horizontal quad, the data is allocated as "10". If the block is split into a vertical quad, the data is allocated as "11". Thus, a quadtree code value is generated. In the embodiment shown in FIG. 3, if the data is allocated as "00", the output of output buffers 117 and 118 is "00" in the disabled state. Accordingly, quadtree code value generator 114 actually generates code values for the three cases of "01", "10" and "11".

In addition, block size determining means 119 receives selective data of the sub-block corresponding to the minimum distribution value detected by minimum value detector 112 and block size data applied to current block memory 56 and changes the block size. Then, the block size is determined by the result for the following three cases. First, whether to split the block into the four quadrant N/2×N/2 blocks 10 (N1, N2, N3 and N4) of layer 2 shown in FIG. 1. Second, whether to horizontally split the block into the four N×N/4 blocks 20 (H1, H2, H3 and H4). Third, whether to vertically split the block into the four N/4×N blocks 30 (V1, V2, V3 and V4). In the same way, the block size is determined by the result for the following three cases. First, whether to split blocks 10 (N1, N2, N3 and N4) into N/4×N/4, N/2×N/8 and N/8×N/2 sub-blocks 11, 12 and 13. Second, whether to split blocks 20 (H1, H2, H3 and H4) into N/2×N/8, N×N/16 and N/4×N/4 blocks 21, 22 and 23. Third, whether to split blocks 30 (V1, V2, V3 and V4) into N/8×N/2, N/4×N/4 and N/16 and N blocks 31, 32 and 33. A quadtree split is repeatedly performed until the block reaches the thus-established minimum size to generate a quadtree. FIG. 7 shows an embodiment of the quadtree drawn up by a three-level quadtree split of the present invention and a bit stream of the quadtree code value generated corresponding thereto. That is, the following code values are generated sequentially. Code value "01" is generated since there is a quadrant quad split of an N×N block, and code value "00" is generated since there is no split of N/2×N/2 quadrant quad sub-block of the second quadrant, and code value "01" is generated since there is a quadrant quad split of N/2×N/2 quadrant quad sub block of the first quadrant, and code value "00, 00, 00, 00" is generated since there is no split into four N/4×N/4 quadrant quad sub-blocks in the first quadrant. Code value "11" is generated since there is a vertical quad split of the N/2×N/2 quadrant quad sub-block of the third quadrant, and code value "00, 00, 00, 00" is generated since there is no split of the four N/8×N/2 sub-blocks of the third quadrant. Code value "01" is generated since there is a quadrant quad split of the N/2×N/2 quadrant quad sub-block of the fourth quadrant, and code value "11, 00, 00, 00" is generated since there is a vertical quad split of the N/4×N/4 quadrant quad sub-block and no more split of the vertically quad split N/16×N/4 sub-blocks. Code value "01, 00, 00, 00" is generated since there is a normal quad split of the N/4×N/4 quadrant quad sub-block and no split of the N/8×N/8 sub-blocks. Code value "11, 00, 00, 00, 00" is generated since there is a vertical quad split of the N/4×N/4 quadrant quad sub-block and no split of the N/16×N/14 sub-blocks. Code value "10, 00, 00, 00, 00" is generated since there is a horizontal quad split of the N/4×n/4 normal quad sub-block and no split of the N/4×N/16 sub-blocks.

Quadtree code value e and average value f are input to quadtree map drawing portion 200 and re-arranged as a bit stream to meet a transmission speed of a predetermined clock. First, as shown in FIG. 4, address decoder 201 selects a suitable address according to quadtree data 3 input from quadtree generator 100, reads data of ROM table 202 and sends the result to bit stream array 203. After the quadtree data for the current block is arranged, the average value data for the block is written.

When a quadtree splitting operation is completed through the above-described process, the adjacent N×N block is split. Thus, the above-described process is repeated so that a quadtree structure necessary for the data of the entire image and the representative value, i.e., an average value, can be obtained.

Figure 8A:
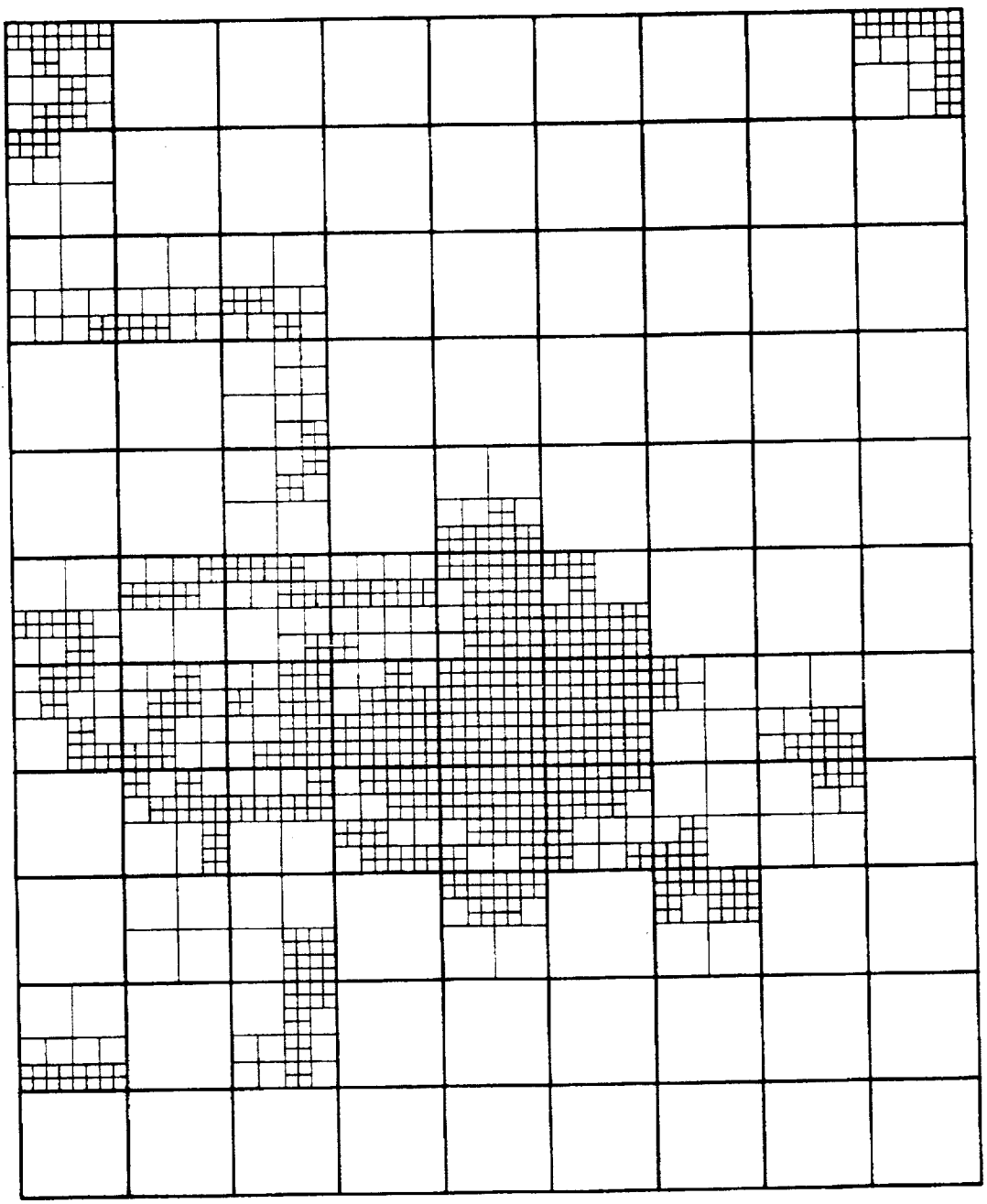
FIG. 8A illustrates an embodiment of a conventional quadtree split.
Figure 8B:
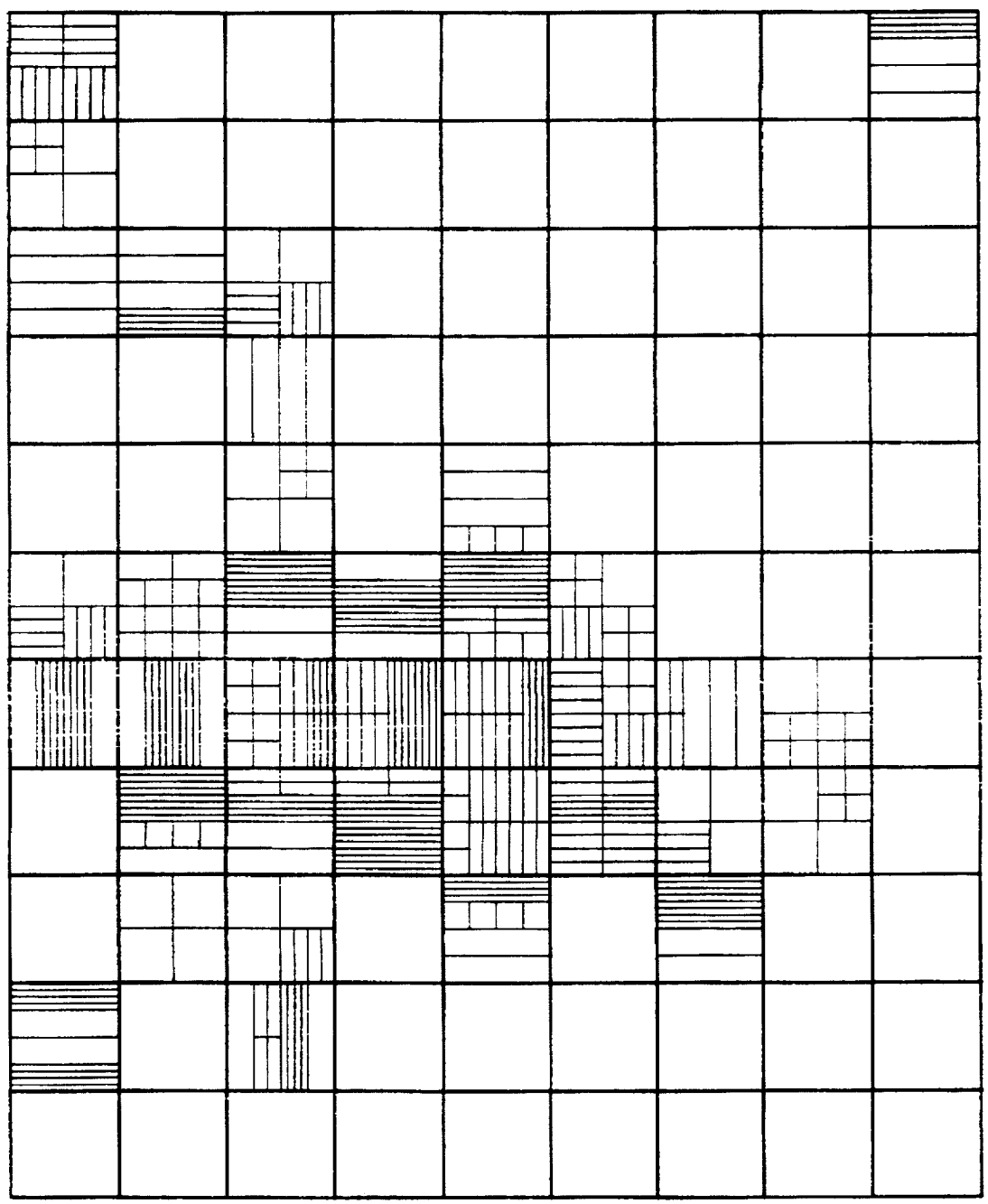
FIG. 8B illustrates an embodiment of a quadtree split of the present invention.

As shown in FIG. 8B, the split can be accomplished more flexibly by such quadtrees as normal, horizontal, and vertical quadtrees. Thus, an image which is close to the original image can be reconstructed by merely a low-level split. As a result, a good quality image having no distortion can be expressed by only a small quantity of data as compared with the conventional method shown in FIG. 8A, thereby improving the data compression rate.

What is claimed is:

1. An image compression method employing a conditional quadtree split method comprising:

(a) inputting image data in frame or field units as blocks having a predetermined size;

(b) generating an average value of all pixels of each block for each block and a sub-block code value corresponding to a distribution value of all pixels in each sub-block for each sub-block for determining whether to perform sequential quad-splitting of the block into one of a plurality of types of sub-blocks according to an image type of the block; and (c) outputting a quadtree map drawn according to the sub-block code value and the average value of each block, as a bit stream, wherein step (b) comprises:

obtaining a distribution value and an average value of all pixels in the block and in each sub-block with respect to the plurality of types of sub-blocks; and determining whether to split a block or sub-block by comparing the respective distribution value to a threshold value.

2. The image compression method according to claim 1, wherein the types of sub-blocks are obtained by quadrant quartering, vertical quartering, and horizontal quartering.

3. The image compression method according to claim 1, wherein each block has a distribution value with respect to all pixels in the block or an image variation value between frames.

4. The image compression method according to claim 1, wherein step (b) further comprises:
  (b-3) generating a first sub-block code value and the average value as quadtree data, if the block is not to be split and splitting a block into sub-blocks otherwise;
  (b-4) comparing the distribution values for each sub-block and detecting the minimum distribution value, if the block is to be split:
  (b-5) selecting an average value corresponding to the minimum of the average values for the plurality of split blocks;
  (b-6) generating the sub-block code value corresponding to the selected minimum average value;
  (b-7) generating the selected average value and the sub-block code value as quadtree data;
  (b-8) determining an input block size in the detecting step; and
  repeating steps (b-4) to (b-8) until the size of the sub-block reaches a predetermined size.

5. An image compression apparatus employing a conditional quadtree split method comprising:
  a block memory for receiving and storing image data in frame or field units as blocks having a predetermined size;
  a quadtree generator for generating a first average value of all pixels in each block for each block and a sub-block code value corresponding to a second distribution value of all pixels in each sub-block for each sub-block for determining whether to perform sequential quad-splitting of the block into one of a plurality of types of sub-blocks according to an image type of the block, said quadtree generator comprising:
    first computing means for obtaining a first distribution value and the first average of all pixels in a block in said block memory,
    second computing means for obtaining the second distribution value and a second average value from all pixels in each sub-block for the sub-blocks in said block memory, and
    a comparator for comparing the first distribution value with a threshold value to determine whether to split a block, and
  quadtree map drawing means for outputting a quadtree map drawn according to the sub-block code value and the average value for each block, as a bit stream.

6. The image compression apparatus according to claim 5, wherein the types of sub-block are quadrant quartered, vertical quartered, and horizontal quartered.

7. The image compression apparatus according to claim 5, wherein each block has a distribution value with respect to the pixels in respective blocks or an image variation value between frames.

8. The image compression apparatus according to claim 5, wherein said quadtree generator comprises:

a minimum value detector for detecting the minimum of the second distribution values by comparing the second distribution values for the sub-blocks;

a data selector for selecting an average value corresponding to the minimum second distribution value detected;

a quadtree code value generator for generating the sub-block code value corresponding to the detected minimum second distribution value;

an output selector for selecting, according to the determination of said comparator, one of the first average value, the code value, and the second average value, and outputting the value selected as selective split data and an average value; and block size determining means for determining size of a next input block with reference to block size data input currently according to detecting by said minimum value detector.

9. The image compression apparatus according to claim 5, wherein said quadtree map drawing means comprises:
  an address decoder for decoding the sub-block code value and generating an address signal;
  a ROM table for generating a quadtree map designated by the address signal; and
  a bit stream array for outputting the generated quadtree map and the average value as a bit stream.

10. An image compression apparatus employing a conditional quadtree split method comprising:
  a frame memory for receiving frame unit image data;
  a data selector for selecting image data and image variation data provided by said frame memory;
  a block memory for receiving and storing the image data selected by said data selector in block units having a predetermined size;
  a quadtree generator for generating a first average value of all pixels in each block for each block and a sub-block code value corresponding to a second distribution value of all pixels in each sub-block for each sub-block for determining whether to perform sequential quad-splitting of the block into one of a plurality of types of sub-blocks according to an image type of the block, said quadtree generator comprising:
    first computing means for obtaining the first distribution value and a first average of all pixels in a block in said block memory,
    second computing means for obtaining the second distribution value and a second average value from all pixels in each sub-block for the sub-blocks in said block memory, and
    a comparator for comparing the first distribution value with a threshold value to determine whether to split a block,
  quadtree map drawing means for outputting a quadtree map drawn according to the sub-block code value and the average value for each block, as a bit stream;
  an image synthesizer for receiving the bit stream output from said quadtree map drawing means to synthesize image data;
  a reproduction memory for storing image data of a previous frame reproduced by said image synthesizer;
  subtracting means for obtaining image variation data between image data of a current frame provided by said frame memory and image data of the previous frame provided by said reproduction memory; and
  a transmission buffer for transmitting the bit stream output from said quadtree map drawing means.

* * * * *